US007011693B2

(12) United States Patent
Mallavarapu et al.

(10) Patent No.: US 7,011,693 B2
(45) Date of Patent: Mar. 14, 2006

(54) CONTROL OF A HYDROGEN PURIFYING PRESSURE SWING ADSORPTION UNIT IN FUEL PROCESSOR MODULE FOR HYDROGEN GENERATION

(75) Inventors: Kiran Mallavarapu, Rochester, NY (US); John B Ruhl, Rochester, NY (US); Craig S. Gittleman, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 205 days.

(21) Appl. No.: 10/706,319

(22) Filed: Nov. 12, 2003

(65) Prior Publication Data

US 2005/0098033 A1 May 12, 2005

(51) Int. Cl.
*B01D 53/047* (2006.01)

(52) U.S. Cl. .................... 95/22; 95/23; 95/96; 95/119; 95/130; 95/139; 95/140; 95/143; 96/110; 96/114; 96/115; 96/124; 96/130; 96/143

(58) Field of Classification Search .................... 95/19, 95/22, 23, 96–106, 117–119, 130, 139, 140, 95/143; 96/110, 124, 113–115, 130, 143; 137/625.29, 625.31
See application file for complete search history.

(56) References Cited

U.S. PATENT DOCUMENTS 4,280,824 A * 7/1981 Lassmann et al. ............. 95/97
4,925,464 A 5/1990 Rabenau et al.
5,112,367 A 5/1992 Hill
5,154,736 A * 10/1992 Mifflin ........................ 95/100
5,366,541 A 11/1994 Hill et al.
5,487,775 A * 1/1996 LaCava et al. ................ 95/98
5,547,492 A * 8/1996 Cho et al. ..................... 95/100
5,632,804 A * 5/1997 Schartz ........................ 95/101
5,669,960 A * 9/1997 Couche ......................... 95/96
5,820,656 A * 10/1998 Lemcoff et al. ............... 95/96
5,891,217 A * 4/1999 Lemcoff et al. ............... 95/96
6,063,161 A * 5/2000 Keefer et al. ................. 95/100
6,068,680 A * 5/2000 Kulish et al. .................. 95/98
6,311,719 B1 * 11/2001 Hill et al. ................... 137/312
6,372,026 B1 * 4/2002 Takemasa et al. ............ 96/112
6,488,747 B1 * 12/2002 Keefer et al. ................. 96/125
6,514,317 B1 * 2/2003 Hirano et al. .................. 95/96
6,558,451 B1 * 5/2003 McCombs et al. ............. 95/98
2002/0004157 A1 1/2002 Keefer et al.
2002/0110504 A1 8/2002 Gittleman et al.
2004/0025692 A1 * 2/2004 Sumida et al. ................. 95/96

FOREIGN PATENT DOCUMENTS

WO WO 00/16425 3/2000

* cited by examiner

*Primary Examiner*—Robert H. Spitzer
(74) *Attorney, Agent, or Firm*—Cary W. Brooks

(57) ABSTRACT

A PSA unit for purifying hydrogen in a fuel processor system. The PSA unit employs rotary valves that cycle the pressurization of vessels, including an adsorbent, between a high pressure state and a low pressure state. The purified hydrogen is released from the vessels through a purified gas output port when the vessels are in the high pressure state and the impurities are released through an exhaust port when the vessels are in the low pressure state. The PSA unit also employs a mass flow control device and a pressure sensor in the purified gas output port. A controller receives a pressure signal from the pressure sensor, and controls the flow through the mass flow control device and the speed of the rotary valves so that the proper pressure is maintained at the hydrogen output port.

20 Claims, 2 Drawing Sheets

CONTROL OF A HYDROGEN PURIFYING PRESSURE SWING ADSORPTION UNIT IN FUEL PROCESSOR MODULE FOR HYDROGEN GENERATION

BACKGROUND OF THE INVENTION

1. Field of the Invention

This invention relates generally to a pressure swing adsorption (PSA) unit for providing a purified gas and, more particularly, to a PSA unit for purifying hydrogen in a stand-alone fuel processor for a hydrogen fuel cell engine, where the PSA unit employs a pressure sensor for measuring the output pressure of the purified hydrogen and a mass flow controller for measuring and controlling the output pressure of the purified hydrogen to control the hydrogen purity.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular type of fuel cell for vehicles. The PEMFC generally includes a solid polymer electrolyte proton conducting membrane, such as a perflurosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode input gas as a flow of air, typically forced through the stack by a compressor. Not all of the oxygen in the air is consumed by the stack and some of the air is output as a cathode exhaust gas that may include water as a stack by-product. In some cases, the exhaust gas can be re-circulated so that any remaining oxygen therein can be used.

In vehicular fuel cell applications, it is desirable to use a liquid fuel, such as alcohols (methanol or ethanol), hydrocarbons (gasoline), and/or mixtures thereof, such as blends of ethanol/methanol and gasoline, as a source of hydrogen for the fuel cell. Such liquid fuels for the vehicle are easy to store on the vehicle. Further, there is a nationwide infrastructure for supplying liquid fuels. Gaseous hydrocarbons, such as methane, propane, natural gas, LPG, etc., are also suitable fuels for both vehicle and non-vehicle fuel cell applications.

Hydrocarbon-based fuels must be disassociated to release the hydrogen therefrom for fueling the cell. The disassociation reaction is accomplished within a chemical fuel processor or reformer. The fuel processor contains one or more reactors where the fuel reacts with steam, and sometimes air, to generate a reformate gas comprising primarily hydrogen and carbon dioxide. For example, in steam methanol reformation process, methanol and water are reacted to generate hydrogen and carbon dioxide. However, carbon monoxide and water are also produced. In a gasoline reformation process, steam, air and gasoline are reacted in a fuel processor that contains two sections. One section is primarily a partial oxidation reactor (POX) and the other section is primarily a steam reformer (SR). The fuel processor produces hydrogen, carbon dioxide, carbon monoxide and water.

The known fuel processors also typically include downstream reactors, such as a water/gas shift (WGS) reactor and a preferential oxidation (PROX) reactor. The PROX reactor is necessary to remove carbon monoxide in the reformate gas because carbon monoxide contaminates the catalytic particles in the PEM fuel cell. The PROX reactor selectively oxidizes carbon monoxide in the presence of hydrogen to produce carbon dioxide ($CO_2$) using oxygen from air as an oxidant. However, the use of a PROX reactor in a fuel processor affects processor performance. For example, control of the air feed is important to selectively oxidize CO to $CO_2$. Also, the PROX reactor is not 100% selective, and thus results in consumption of hydrogen. Therefore, some hydrogen that would normally be available to provide power is consumed by the PROX reactor. Hence, less power output is provided per a given size stack of fuel cells. Further, the heat generated from the PROX reactor is at low temperature, resulting in excess low-grade heat. Also, typical catalysts used in a PROX reactor contain precious metals, such as platinum or iridium, which are very expensive.

The hydrogen generated in a fuel processor using a PROX reactor for CO clean-up typically contains less than 50% hydrogen, where the balance of the hydrogen-rich reformate gas consists primarily of carbon dioxide, nitrogen and water. Thus, the reformate gas is not suitable for compression and storage because much energy would be wasted in compressing the non-hydrogen components in the reformate gas. Also, valuable storage space would be wasted to contain the non-hydrogen components.

Certain techniques do exist in the art for generating nearly pure hydrogen in non-automotive fuel processing systems. One technique of generating pure hydrogen in a fuel processing system includes the use of hydrogen permeable membranes. These membranes selectively allow the hydrogen to pass through and prevent the other by-products in the reformate gas from permeating through. Typical membranes for these applications contain palladium, which is very expensive. Also, these membranes only operate at relatively high temperatures (250–550° C.), and thus, it takes a long time after the low temperature start-up for a fuel processing system containing hydrogen permeable membranes to be able to generate hydrogen. Additionally, these membranes operate at very high pressures (>5 bar), which leads to high compressor loads and inefficient systems.

It has been suggested in the art that a pressure swing adsorber (PSA) unit can be used to generate nearly pure hydrogen from the reformate gas in a fuel processor system. A fuel cell system employing a PSA unit is described in commonly owned U.S. patent application Ser. No. 09/780,184, published Aug. 15, 2002 as publication No. US 2002/0110504 A1, and herein incorporated by reference. In the fuel cell system disclosed in the '184 application, the PSA unit is integrated within the fuel cell stack. The PSA unit uses the anode off-gas from the fuel cell as a purge stream within the PSA unit or uses the cathode off-gas from the fuel cell to combust the low-pressure exhaust gas from the PSA unit. Additionally, both the anode and cathode off-gas can be used. Such a system could not be used as a stand-alone hydrogen generator, where the hydrogen gas is stored for subsequent use in a fuel cell engine.

U.S. patent application Ser. No. 10/389,375, filed Mar. 13, 2003, titled "Fuel Processor Module for Hydrogen Production for a Fuel Cell Engine Using Pressure Swing Adsorption," assigned to the assignee of this application, and herein incorporated by reference, also discloses another fuel processor system employing a pressure swing adsorption unit.

In one design, the PSA unit is a rapid-cycle device that includes one input port and two output ports. The reformate gas being purified enters the PSA unit through the input port, the purified hydrogen gas exits the PSA unit through one of the output ports and an exhaust gas including the non-hydrogen gases in the reformate gas exits the PSA unit through the other output port. The PSA unit includes a plurality of compartments or vessels that include an adsorbent that adsorbs the non-hydrogen by-products in the reformate gas. The vessels are cycled between high pressure and low pressure states. When a particular vessel is in a high pressure state, the adsorbent adsorbs the by-products, but the smaller hydrogen atoms do not get adsorbed.

PSA units are typically very large and consist of a minimum of two separate adsorption vessels including numerous valves and manifolds. In a two-vessel system, one vessel would be in the adsorption mode and the other vessel would be in various stations of blow-down, purge and pressurization. Many commercial hydrogen PSA units use four vessels, where one vessel is in the adsorption mode at any given time, and the other three vessels are in the various stages of equalization, blow-down, purge and pressurization. Also, some commercial hydrogen PSA units employ twelve vessels, with four vessels in the adsorption mode at any given time, and the other eight vessels in the various stages of equalization, blow-down, purge and pressurization. It is well known that PSA units with more than two vessels exhibit higher hydrogen recoveries and reduced power by incorporating pressure equalization steps. These PSA units, however, include complex valve arrangements and are non-continuous due to the cycling of these valves.

One known way to cycle a multi-bed PSA unit is with rotary valves. PSA systems employing rotary valves are described in U.S. Pat. Nos. 4,925,464; 5,112,367 and 5,366,541. These patents describe devices that use a single rotary valve that rotates relative to a stationary port plate to direct gases to the various vessels in the PSA system as defined by the PSA cycle. U.S. patent application Ser. No. 10/706,320, filed Nov. 12, 2003, titled "Hydrogen Purification Process Using Pressure Swing Adsorption for Fuel Cell Applications," assigned to the assignee of this application, and herein incorporated by reference, discloses a PSA unit employing two rotary valves and defines a particular PSA cycle.

Systems with only one rotary valve directing flow to the feed end of adsorbent vessels are limited to using PSA cycles with feed-feed equalization. However, any cycle that can be defined using a collection of valves can be replicated by using rotary valves, one at the feed of the adsorbent vessels and one at the product end of the vessels. Such PSA systems with two rotary valves are described in U.S. Pat. Nos. 5,820,656 and 5,891,217.

A challenge in operating PSA systems that employ rotary valves is the ability to properly control the speed of the rotary valves with changes in the demand of the product gas. It is known that PSA units are employed in the medical industry to provide purified oxygen for hospital uses. For oxygen purifying PSA units, an oxygen purity sensor is employed to control the speed of the rotary valve within the unit to ensure that the purified gas output has the desired oxygen purity.

A hydrogen purity sensor could be employed in a hydrogen purifying PSA unit to ensure that the product purity is maintained at the purified gas output. However, such hydrogen purity sensors are typically very costly and bulky, and thus do not have significant applicability for an automotive application. Further, such hydrogen purity sensors have a limited range of measurement and cannot provide real-time data measurement.

SUMMARY OF THE INVENTION

In accordance with the teachings of the present invention, a PSA unit is disclosed for providing a purified gas. In one embodiment, the PSA unit is employed in a fuel processor system for providing purified hydrogen. The PSA unit includes an input port that receives a feed gas to be purified, a purified gas output port that outputs the purified gas and an exhaust port that outputs the unwanted by-products in the feed gas. The PSA unit employs a plurality of vessels including one or more suitable adsorbents that adsorb the by-products in the feed gas. A rotary feed valve and a rotary product valve direct the flow of gases into and out of the vessels to generate the various states of the PSA cycle used to purify the feed gas and remove the by-products therefrom.

The PSA unit also employs a mass flow control device and a pressure sensor positioned in the purified gas output port of the PSA unit. The mass flow control device used can also be capable of measuring the mass flow. A controller receives a signal from the pressure sensor indicating the pressure of the purified gas at the purified gas output. Based on this pressure, the controller controls the flow through the mass flow control device and the speed of the rotary valves so that the proper pressure is maintained at the purified gas output port to provide the desired product gas flow rate and the level of product gas purity.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a PSA unit for generating a nearly pure gas is merely exemplary in nature, and is in no way intended to limit the invention or its applications or uses. For example, the PSA unit described herein has particular application in a stand-alone fuel processor for generating pure hydrogen for a fuel cell engine. However, the PSA unit of the invention has a much broader application, including, but not limited to, medical applications for generating pure oxygen.

Figure 1:
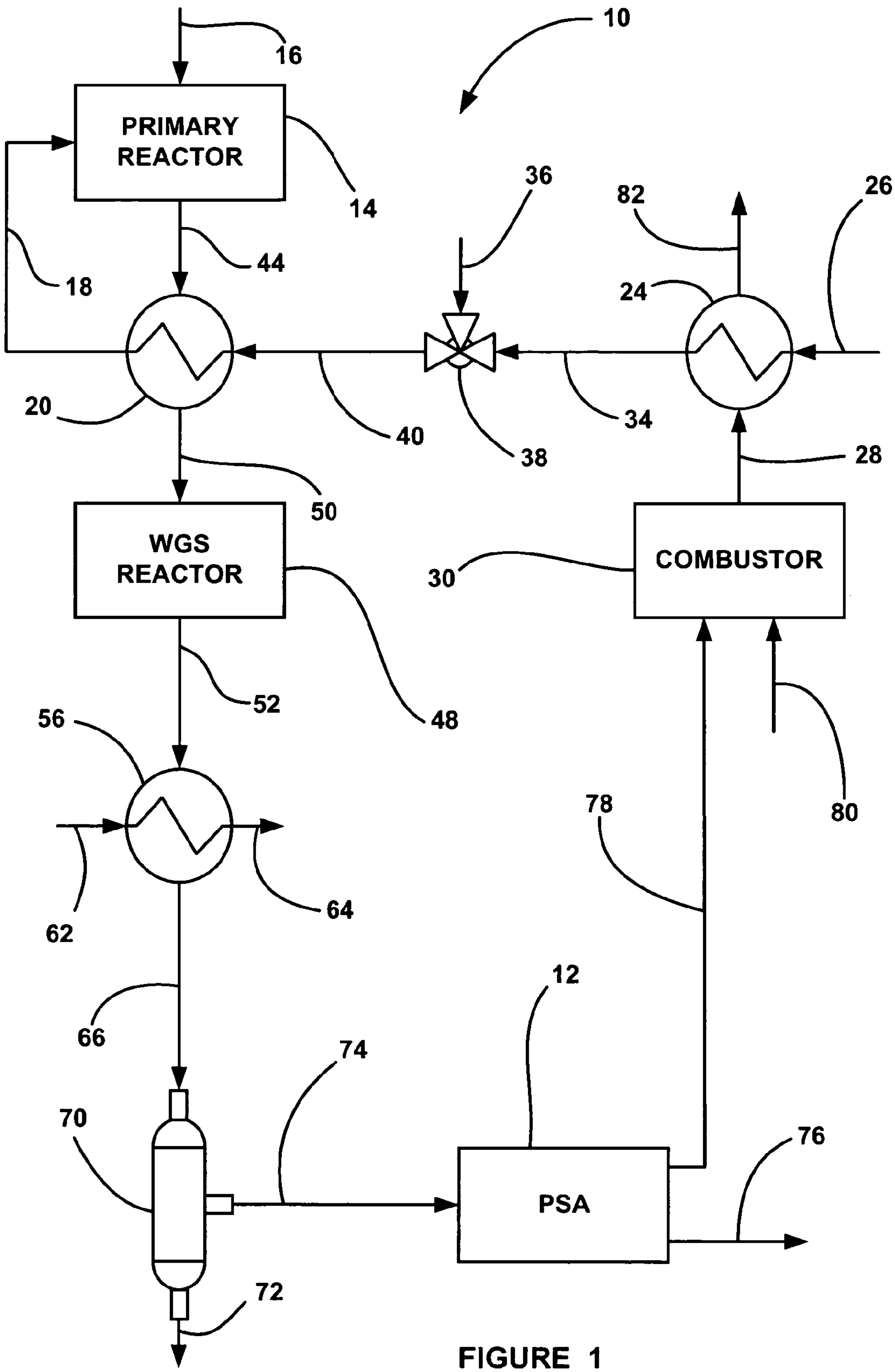
FIG. 1 is a plan view of a fuel processor system employing a PSA unit, according to an embodiment of the present invention.

FIG. 1 is a plan view of a fuel processor system 10 for generating nearly pure hydrogen to be used in a fuel cell engine. According to the invention, the fuel processor system 10 employs a rapid-cycle pressure swing adsorber (PSA) unit 12, discussed below, as a primary device for removing carbon monoxide and other unwanted by-products from a reformate gas to generate pure hydrogen. As discussed above, it is necessary to remove carbon monoxide from the hydrogen gas being used in a fuel cell because carbon monoxide contaminates the catalytic particles used in the fuel cell.

A hydrocarbon fuel, such as gasoline, natural gas, methane, propane, methanol and/or mixtures thereof, is fed to a primary reactor 14, such as an autothermal reactor, from a suitable source (not shown) on a line 16. The hydrocarbon fuel reacts with a steam/air mixture received on a line 18 from a heat exchanger 20 to dissociate the hydrogen from the fuel and generate a reformate gas including separated hydrogen and the other by-products. The reactor 14 includes a steam reforming and/or partial oxidation catalyst suitable for the specific fuel being used. The temperature of the reactor 14 depends on the nature of the fuel and the relative compositions of fuel, air and water, and is typically between 300° C. and 1200° C. The fuel is converted to hydrogen in the reactor 14 either by partial oxidation, steam reforming or autothermal reforming. The reformate gas exiting the primary reactor 14 on line 44 contains primarily hydrogen, nitrogen, carbon monoxide, carbon dioxide, water and possibly methane. The carbon monoxide concentration of the reformate gas on the line 44 is typically between about 5 mole percent and about 20 mole percent.

The steam for the steam/air mixture is generated in a heat exchanger 24, where liquid water from steam provided on a line 26 is heated and vaporized in the heat exchanger 24 by a hot exhaust stream on a line 28 from a combustor 30, discussed below. The steam exits the heat exchanger 24 on a line 34 and is mixed with compressed air provided on a line 36 in a mixing valve 38. The steam/air mixture exits the valve 38 on a line 40 to be sent to the heat exchanger 20 to form the hot steam/air mixture on the line 18 sent to the reactor 14. The heat required to raise the temperature of the steam on the line 40 in the heat exchanger 20 is generated by the reformate gas from the reactor 14 on the line 44. Alternately, the air and water can be heated separately and mixed either within or before the primary reactor 14.

The reformate gas on the line 44 is cooled in the heat exchanger 20 to the operational temperature of a WGS reactor 48. The cooled reformate gas is then applied to the WGS reactor 48 on a line 50, where carbon monoxide and water are converted to hydrogen and carbon dioxide by a reaction process that is well understood in the art. The WGS reactor 48 is either a high temperature WGS reactor (320° C.–500° C.), a medium temperature WGS reactor (250° C.–400° C.), or a low temperature WGS reactor (150° C.–250° C.). Alternately, the reactor 48 can include a combination of high, medium and low temperature WGS reactors that employ a technique for cooling the reformate gas as it flows between the different temperature reaction zones. Generally, the temperature of the WGS reactor 48 decreases with the direction of the reformate gas flow.

It is possible to employ a single high temperature WGS reactor or a single medium temperature WGS reactor. These types of reactors are generally smaller than a low temperature WGS reactor or a system with one or more WGS reactors, even though the high temperature WGS reactor does not reduce the CO to very low levels because of equilibrium constraints. This is possible because of the ability of the PSA unit 12 to handle relatively high CO levels that cannot be tolerated by conventional systems that use PROX reactors to convert CO to $CO_2$. Conventional catalysts, such as $Fe_3O_4/Cr_2O_3$ for high temperature shifts or $CuO/ZnO/Al_2O_3$ for low temperature shifts, may be used, as well as any other known WGS catalyst.

The WGS reactor 48 generates a reformate gas flow on a line 52 that is primarily hydrogen, nitrogen, carbon monoxide, carbon dioxide and water. The reformate gas will typically include about 0.3–3 mole percent CO depending on the exit temperature of the WGS reactor 48, the space velocity of the reformate gas on the line 50, the steam to carbon ratio and the catalyst used.

The reformate gas on the line 52 is cooled in a heat exchanger 56 to the operating temperature of the PSA unit 12 (60° C.–100° C.) by a coolant stream on a line 62 applied to the heat exchanger 56. The heated cooling stream from the heat exchanger 56 is provided on output line 64. The coolant stream on the line 62 can be air that is preheated and subsequently fed into the system 10 on the line 36. The heat exchanger 56 also acts as a condenser because the water in the reformate gas on the line 52 condenses as it is cooled. The cooled reformate gas leaves the heat exchanger 56 on a line 66 as a two-phase fluid consisting of a reformate gas and liquid water. The cooled reformate gas is applied to a separator 70 where the liquid water is separate from the reformate gas. The liquid water exits the separator 70 on a line 72. The water on the line 72 may then be reintroduced into the system 10 on the line 26, or any other place in the system 10 where water is used. The cooled reformate gas exits the separator 70 on a line 74, and is saturated with water vapor at a temperature between 60° C. and 100° C.

The cooled reformate gas on the line 74 is applied to the PSA unit 12 to purify the hydrogen therein. The reformate gas on the line 74 will typically enter the PSA unit 12 at a pressure between about 2.5 and about 5 bar. Even higher pressures, up to 15 bar, may be used if the primary reactor 14 is a steam reformer. The PSA unit 12 contains an adsorbent or combination of adsorbents which adsorb all of the materials or by-products in the reformate gas except for the hydrogen. The purified hydrogen gas exits the PSA unit 12 on a line 76, and includes at least 90% hydrogen, and possibly up to 99.9% hydrogen. The CO level of the gas on the line 76 is less than about 100 ppm, and possibly less than 1 ppm. The remaining portion of the gas on the line 76 is primarily nitrogen, but may also contain up to 1% methane. If it is desired to reduce the CO concentration in the gas on the line 76 to lower levels, the gas may be fed over a methanation catalyst (not shown) where the remaining CO will react with hydrogen to form methane.

The purified hydrogen gas on the line 76 leaves the PSA unit 12 at essentially the same pressure at which it entered, typically between 2.5 and 5 bar, allowing for a slight pressure drop of no more than 2 psi. All of the non-hydrogen gases ($CO$, $CO_2$, $N_2$, $H_2O$ and $CH_4$), as well as any fraction of the hydrogen, is exhausted from the PSA unit 12 at about atmospheric pressure on a line 78. At least 70% of the hydrogen on the line 74 should be recovered to be sent on the line 76. It would be desirable if at least 80% of the hydrogen on the line 74 is recovered on the line 76, and most desirable if 87% of the hydrogen is recovered.

The hydrogen gas on the line 76 may either be fed directly into the anode side of a fuel cell stack (not shown) or stored via compression or liquefaction in a solid form, such as hydride, or in an adsorbed state on a carbon nanotube. The stored hydrogen gas may then be subsequently sent to a fuel cell engine (not shown) to be used for generating electricity.

The exhaust gas on the line 78 is sent to the combustor 30, and may or may not be heated before entering the combustor 30. This exhaust gas heating could be achieved by heat exchanging with a temperature regulating fluid, such as air, water, glycol, or any other suitable coolant. The hydrogen and carbon monoxide in the exhaust gas on the line 78 react with oxygen in an air stream on a line 80 in the combustor 30 to form carbon dioxide and water. The air stream on the line 80 may be the exhaust gas from the cathode side of a fuel cell stack or an independent air source. If there is methane in the exhaust flow on the line 78 it may also be burned in the combustor 30. If the system 10 is integrated with a fuel cell stack, anode exhaust, which is primarily made up of hydrogen, may also be burned in the combustor 30.

Heat is generated in the combustor 30 by exothermic combustion reactions and leaves the combustor 30 as a hot combustor exhaust gas on the line 28. As discussed above, the heat is used to vaporize the water on the line 26 in the heat exchanger 24. The combustion exhaust gas on the line 28 contains primarily nitrogen, carbon dioxide and water. A cooled combustion gas stream from the heat exchanger 24 is provided on a line 82. Alternately, the combustion exhaust gas may be used to preheat the air stream on the line 36. Liquid water may be collected from the cooled stream on the line 82, and used as water to be fed into the system 10 on the line 26.

Thus, the system 10 can operate as a stand-alone system in that it does not need to be in the vehicle to provide hydrogen directly to the fuel cell stack. The system 10 can be located at a residence, service station, or the like, where the hydrogen is stored in tanks to be transferred to tanks on the vehicle. Certain of the lines discussed above, such as the line 80, can come from the fuel cell. However, this is by way of example in that the fluid on the particular line can come from any other suitable source.

The PSA unit 12 is a rapid-cycle device that includes a plurality of vessels that are at different states of pressure for the adsorption, equalization, blow-down, purge and pressurization steps of the PSA cycle. When the vessels are under pressure, the adsorbent in the vessels adsorb the non-hydrogen by-products and emit purified hydrogen. When the pressure is reduced in the vessel, the by-products are desorbed from the vessel to be exhausted on the line 78. A portion of the flow of the hydrogen gas on the line 76 can be used to flow through a depressurized vessel in the PSA unit 12 to remove the desorbed by-products. Thus, some of the hydrogen may exit the PSA unit 12 on the line 78.

Figure 2:
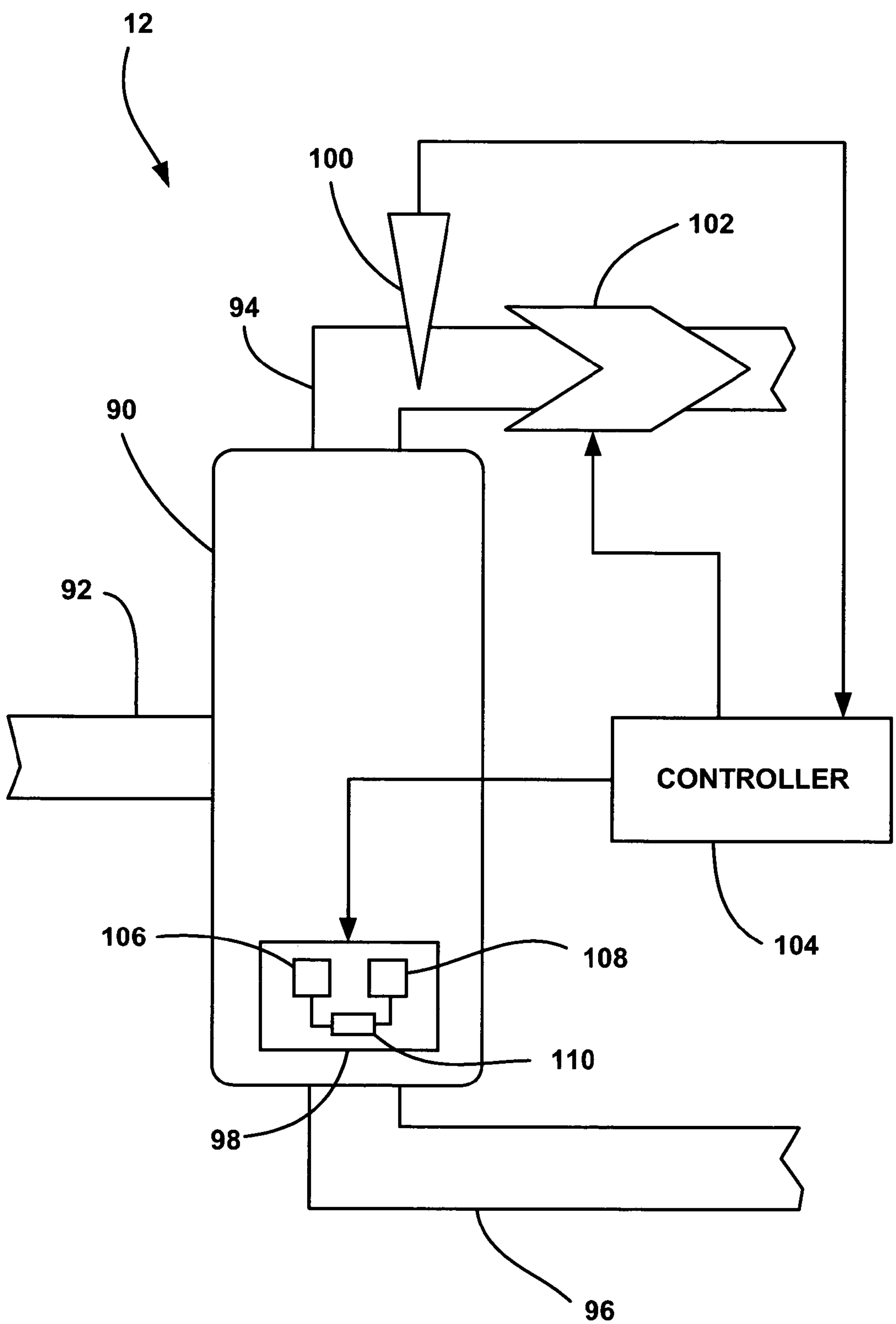
FIG. 2 is a plan view of the PSA unit shown in FIG. 1 separated from the fuel processor system.

FIG. 2 is a plan view of the PSA unit 12 separated from the system 10. The PSA unit 12 includes a housing 90 that houses the various vessels in the pressurized and unpressurized state, and the various valves and manifolds. An input port 92 receives the reformate gas on the line 74 and sends it to a feed gas manifold (not shown) within the housing 90. A purified gas output port 94 is coupled to a product gas manifold (not shown) within the housing 90 and the output line 76 through which the purified hydrogen is output from the PSA unit 12. An exhaust gas port 96 is coupled to an exhaust gas manifold (not shown) within the housing 90 and the line 78 through which the exhaust gas is output from the PSA unit 12.

The PSA unit 12 includes a rotating valve system 98 that cycles the vessels between pressurized and de-pressurized states to adsorb and desorb the by-products. The rotating valve system 98 includes a rotary product valve 106 that couples the product end of each of the vessels to the product manifold, a rotary feed valve 108 that couples the feed end of the vessels to the feed manifold and a single motor 110 that rotates the product valve and the feed valve at the proper speed as discussed herein.

It is the speed of the rotary product valve 106 and the rotary feed valve 108, in combination with the product flow rate, that controls the proper pressure at the output port 94 to provide the desired purity of hydrogen, and that also controls the pressure build up within the vessels so that the PSA unit 12 is not damaged. In other words, at a given flow rate, if the product valve 106 and the feed valve 108 rotate too slowly, the pressure within the vessels could be too high and damage the unit 12. If the product valve 106 and the feed valve 108 rotate too quickly, then the pressure within the vessels does not build up enough to properly adsorb the by-products. Some type of open or closed loop control is needed to control the operation and speed of the valves 106 and 108 in the rotating valve system 98 to provide the proper pressure.

According to the invention, the PSA unit 12 includes a pressure sensor 100 positioned within the output port 94 and a mass flow control (MFC) device 102 positioned in series with the sensor 100 in the output port 94. The pressure sensor 100 senses the pressure in the output port 94, and the MFC device 102 controls and measures the flow of the purified hydrogen through the output port 94, as will be discussed in greater detail below. In another embodiment, the MFC device 102 can be used in combination with a mass flow meter. The pressures sensor 100 and the MFC device 102 can be any device suitable for the purposes described herein.

A controller 104 controls the speed of the motor 110 that drives the product valve 106 and the feed valve 108 in the rotating valve system 98 to properly cycle the vessels between the pressurized states and controls the position (opening) of the MFC device 102. The controller 104 receives an output signal from the pressure sensor 100 indicative of the pressure within the output port 94, and determines the proper cycling speed of the valves 106 and 108 and the flow through the output port 94 provided by the MFC device 102 so that the pressure within the output port 94 is maintained at the pressure that provides the desired purity of hydrogen without damaging the PSA unit 12. The controller 104 can be any controller suitable for the purposes described herein, running any algorithm that provides the desired operation. In one example, the controller 104 is the DS 1401 Microautobox available from Dspace of Novi, Mich. The algorithm can use a PID control employing feedback control with or without feed-forward control.

In one embodiment, the controller 104 includes a PSA controller and an overall system controller. The overall system controller determines how much hydrogen is required based on delivery requirements, and sends a delivery request to the PSA controller. The PSA controller processes and arbitrates this delivery request and determines the speed set-point of the system 98 and the position of the MFC device 102. The overall system controller can be based on open loop control, such as a look-up table, a simple function or a linear interpolation. Alternately, the overall system controller can be based on a closed loop control including feedback. The PSA controller can be based on an open loop control, such as a look-up table, a simple function or a linear interpolation. The PSA controller can also employ a closed loop control that includes open loop control and feedback control of the mass flow measurement and/or valve speed of the valves 106 and 108.

During normal operation, defined as the operation of the PSA unit 12 within the cycling speed limit of the rotating valve system 98, the controller 104 can speed up the rotation of the valves 106 and 108 to decrease the pressure within the port 94. To build pressure within the port 94, the controller 104 will decrease the cycling speed of the valves 106 and 108. A simple open loop control algorithm based on a look-up table of pressure and hydrogen delivery rate can determine the cycling speed of the rotating valve system 98. The cycling speed of the rotating valve system 98 can also be determined by a closed loop algorithm including a combination of the look-up table and the pressure measurement from the sensor 100. In this operating condition, the MFC device 102 will be open to provide the purified hydrogen according to the requirements of the system 10 through a normal open-loop look-up table based on delivery requirements and/or a combination of a feedback algorithm based on the mass flow measurement obtained from the controller 104.

This controller 104 uses the sensor 100 as its primary closed loop sensor and actively controls the cycling speed of the valves 106 and 108 and the hydrogen flow through the MFC device 102. During normal operation, the hydrogen flow through the MFC device 102 is based on the desired hydrogen delivery requirements, and the pressure is controlled by the cycling speed of the valves 106 and 108. In other words, the MFC device 102 is controlled based on the desired amount of hydrogen at the output of the PSA unit 12, and the cycling speed of the rotating valve system 98 is used to control the pressure in the output port 94.

An excess amount of pressure within the pressurized vessels in the housing 90 will cause the controller 104 to actuate the motor 110 to its maximum cycling speed limit as governed by the maximum power provided by the motor. When the cycling speed of rotating valve system 98 reaches its maximum speed, the MFC device 102 can be opened to further reduce the pressure if necessary. Because the pressure is high in this situation, the controller 104 may cause the MFC device 102 to be opened more than what is necessary for its current hydrogen delivery requirements to decrease the pressure in the port 94. This causes excessive hydrogen flow through the port 94, which can be buffered in a storage tank or in a surge tank (not shown). When the excessive pressure condition in the port 94 is no longer present, the MFC device 102 and the rotating valve system 98 return to their normal mode of operation.

Both the cycling of the valve system 98 and the MFC device 102 independently control the pressure within the port 94. The controller 104 uses both of these actuators to control the pressure within the port 94 for different hydrogen delivery requirements. Because the rotating valve system 98 and the MFC device 102 will have different gains, the controller 104 can use these gains to effectively provide the desired pressure, and thus hydrogen purity, in the output port 94. For example, the cycling speed of the rotating valve system 98 is limited and its ability to quickly change its speed is limited. In one embodiment, the highest speed of the motor 110 is 7.5 rpm. If the hydrogen delivery demands require that more reformate gas be applied to the input port 92, the motor 110 would be required to rotate faster to provide the purified hydrogen more quickly. As the cycling speed of the rotating valve system 98 increases, the MFC device 102 would be closed to control the pressure in the output port 94. This type of control is used to maintain pressure and product purity specification during up-transients and down-transients of the delivery requirements of the fuel processor system 10. This helps to speed up the response of the PSA unit 12 during transient conditions, yet maintaining its purity specifications.

The sensor 100, the rotating valve system 98 and the MFC device 102 decrease the cost of the PSA unit 12 by eliminating the need for a hydrogen sensor, and at the same time, safe guards the PSA unit 12 from excessive pressure which can cause explosions or damage to the unit 12. The MFC device 102 and the sensor 100 also have the capability of real-time measurement that is necessary for feedback control operation.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for purifying a gas by removing by-products therefrom to generate a purified gas, said method comprising:

applying the gas to be purified to an input port of a pressure swing adsorber (PSA) unit, said PSA unit including a plurality of rotary valves;

outputting the purified gas through a purified gas output port of the PSA unit;

outputting the by-products through an exhaust gas output port of the PSA unit;

controlling the flow of the purified gas through the purified gas output port to control the pressure in the purified gas output port; and controlling the speed of the rotary valves in the PSA unit to control the pressure in the purified gas output port.

2. The method according to claim 1 further comprising sensing the pressure in the purified gas output port and controlling the speed of the rotary valves and the flow through the purified gas output port based on the sensed pressure.

3. The method according to claim 1 wherein controlling the speed of rotary valves includes controlling the cycling of a plurality of vessels in the PSA unit between high pressure and low pressure states.

4. The method according to claim 1 wherein the purified gas is hydrogen and the by-products include carbon monoxide, carbon dioxide, nitrogen, water and methane.

5. The method according to claim 4 wherein the purified hydrogen is provided to a fuel cell in a vehicle.

6. A fuel processing system for producing hydrogen, said system comprising:

a primary reactor, said primary reactor disassociating hydrogen from a hydrocarbon fuel to generate a reformate gas including hydrogen and other by-products; and a pressure swing adsorption (PSA) unit, said PSA unit being responsive to the reformate gas from the primary reactor and removing the by-products from the reformate gas to generate a nearly pure hydrogen gas, said PSA unit including an input port for receiving the reformate gas, a hydrogen output port for outputting the hydrogen gas and an exhaust output port for outputting the by-products, said PSA unit further including a rotating valve system having a rotary feed valve and a rotary product valve, a mass flow control device positioned in the hydrogen output port and a controller, said controller controlling the cycling speed of the rotary valves within the rotating valve system and the position of the mass flow control device so as to control the pressure within the hydrogen output port.

7. The system according to claim 6 wherein the PSA unit further includes a pressure sensor positioned within the hydrogen output port, said pressure sensor providing a pressure signal to the controller indicative of the pressure within the hydrogen output port, said controller controlling the cycling speed of the rotary valves within the rotating valve system and the position of the mass flow control device based on the pressure signal.

8. The system according to claim 7 wherein the controller employs a closed loop control algorithm with or without feed-forward control to provide the proper speed of the rotary valves and the proper position of the mass flow control device based on the pressure signal and a mass flow signal.

9. The system according to claim 6 wherein the controller employs an open loop algorithm including a look-up table to provide the proper speed of the rotary valves.

10. The system according to claim 6 wherein the PSA unit adsorbs carbon monoxide, carbon dioxide, water, nitrogen and methane as the by-products.

11. The system according to claim 6 wherein the PSA unit includes a plurality of vessels and wherein the rotating valve system cycles the vessels between pressurized and de-pressurized states.

12. The system according to claim 11 wherein the plurality of vessels operate in one of an adsorption, equalization, blow-down, purge or pressurization mode.

13. The system according to claim 6 wherein the fuel processing system is coupled to a fuel cell in a vehicle.

14. The system according to claim 6 wherein the fuel processing system is part of a hydrogen storage facility.

15. A gas purifying system for purifying a gas and outputting a purified gas, said system comprising:

an input port responsive to the gas to be purified;

a purified gas output port outputting the purified gas;

an exhaust gas port outputting unwanted by-products from the gas being purified;

a rotating valve system including a rotary product valve and a rotary feed valve, said valve system cycling vessels within the gas purifying system;

a mass flow control device positioned within the purified gas output port and controlling the flow of the purified gas therethrough; and a controller, said controller controlling the speed of the rotary valves and the position of the mass flow control device so as to control the pressure within the purified gas output port.

16. The system according to claim 15 further comprising a pressure sensor positioned within the purified gas output port, said pressure sensor providing a pressure signal to the controller indicative of the pressure within the purified gas output port, said controller controlling the speed of the rotary valves and the position of the mass flow control device based on the pressure signal.

17. The system according to claim 16 wherein the controller employs a closed loop control algorithm including a look-up table to provide the proper speed of the rotary valves and position of the mass flow control device based on the pressure signal.

18. The system according to claim 15 wherein the controller employs an open loop algorithm including a look-up table to provide the proper speed of the rotary valves.

19. The system according to claim 15 wherein the purified gas is a hydrogen gas and the by-products include carbon monoxide, carbon dioxide, nitrogen, water and methane.

20. The system according to claim 15 wherein the gas purifying system is a pressure swing adsorption unit, and wherein the rotating valve system cycles the pressurization of the vessels between adsorption, equalization, blow-down, purge and pressurization states.

* * * * *